(12) United States Patent
Cadbury-Allen (10) Patent No.: US 12,103,587 B2
(45) Date of Patent: Oct. 1, 2024

(54) VEHICLE CHASSIS HAVING TWIN WALLED BEAMS WITH SUSPENSION MOUNTING STRUCTURE

(71) Applicant: Caterpillar SARL, Geneva (CH)

(72) Inventor: Joel Kenneth Cadbury-Allen, Hartlepool (GB)

(73) Assignee: Caterpillar SARL, Geneva (CH)

( * ) Notice: Subject to any disclaimer, the term of this patent is extended or adjusted under 35 U.S.C. 154(b) by 95 days.

(21) Appl. No.: 17/606,564

(22) PCT Filed: Jan. 9, 2020

(86) PCT No.: PCT/EP2020/050401
§ 371 (c)(1),
(2) Date: Oct. 26, 2021

(87) PCT Pub. No.: WO2020/216478
PCT Pub. Date: Oct. 29, 2020

(65) Prior Publication Data
US 2022/0227421 A1    Jul. 21, 2022

(30) Foreign Application Priority Data
Apr. 26, 2019 (GB) .................................. 1905875.9

(51) Int. Cl.
*B62D 21/11* (2006.01)
*B62D 21/02* (2006.01)
*B60G 7/02* (2006.01)

(52) U.S. Cl.
CPC .............. *B62D 21/11* (2013.01); *B62D 21/02* (2013.01); *B60G 7/02* (2013.01);
(Continued)

(58) Field of Classification Search
CPC .......... B62D 21/11; B62D 21/02; B60G 7/02; B60G 2200/341; B60G 2204/143; B60G 2300/0262; B60G 2300/09
See application file for complete search history.

(56) References Cited

U.S. PATENT DOCUMENTS 2,107,382 A * 2/1938 Maddock ............... B62D 21/02
181/227
7,455,306 B2   11/2008 Ramsey et al.
(Continued)

FOREIGN PATENT DOCUMENTS

| CN | 201300888 Y | 9/2009 |
| CN | 104787119 A | 7/2015 |
| CN | 106828605 A | 6/2017 |

OTHER PUBLICATIONS

International Search Report related to Application No. PCT/EP2020/050401; reported on Apr. 2, 2020.
(Continued)

*Primary Examiner* — Jason D Shanske
*Assistant Examiner* — Matthew James O'Neill (57) ABSTRACT

A vehicle chassis comprises a pair of beams, each beam having generally parallel side plates extending in height and length dimensions Hc, Lc of the chassis and joined by one or more webs extending between the side plates in the width dimension Wc, which together form its principal loadbearing elements. At least one of the beams includes at least one suspension mount which extends between the side plates and connects the side plates together.

17 Claims, 4 Drawing Sheets

(52) U.S. Cl.
CPC .. *B60G 2200/341* (2013.01); *B60G 2204/143* (2013.01); *B60G 2300/0262* (2013.01); *B60G 2300/09* (2013.01)

(56) References Cited

U.S. PATENT DOCUMENTS

| | | | |
|---|---|---|---|
| 7,635,138 | B2 | 12/2009 | Imre et al. |
| 8,641,066 | B2 | 2/2014 | Kudla et al. |
| 8,967,644 | B2 | 3/2015 | Van Der Knaap et al. |
| 9,688,327 | B2 | 6/2017 | Conaway et al. |
| 9,701,341 | B2 | 7/2017 | Ormiston et al. |
| 2003/0034643 | A1 | 2/2003 | Stanley |
| 2005/0205324 | A1 | 9/2005 | Saxon et al. |
| 2007/0126263 | A1* | 6/2007 | Ramsey ................. B62D 33/00 296/203.01 |
| 2014/0232144 | A1 | 8/2014 | Suzuki |
| 2017/0370451 | A1 | 12/2017 | Wall et al. |
| 2018/0022388 | A1* | 1/2018 | Nishikawa ............. B62D 21/06 296/187.09 |
| 2018/0334004 | A1 | 11/2018 | Andreasen et al. |
| 2018/0361811 | A1* | 12/2018 | Chua ..................... B60G 9/003 |
| 2019/0135346 | A1* | 5/2019 | Moen ..................... B62D 21/18 |
| 2020/0164706 | A1* | 5/2020 | White ..................... B60G 3/20 |

OTHER PUBLICATIONS

Great Britain Search Report related to Application No. 1905875.9 reported on Oct. 16, 2019.

\* cited by examiner

VEHICLE CHASSIS HAVING TWIN WALLED BEAMS WITH SUSPENSION MOUNTING STRUCTURE

CROSS-REFERENCE TO RELATED APPLICATION

This Application is a 35 USC § 371 US National Stage filing of International Application No. PCT/EP2020/050401 filed on Jan. 9, 2020 which claims priority under the Paris Convention to Great Britain Patent Application No, No. 1905875.9 filed on Apr. 26, 2019.

TECHNICAL FIELD

This disclosure relates to chassis for vehicles comprising a pair of rails or beams extending in spaced relation along the length of the vehicle, wherein each beam comprises two principal walls or side plates extending in the length and height dimensions and arranged in spaced, generally parallel relation, for example, as a box section. In particular, the disclosure relates to the arrangement in such chassis of a suspension mounting structure for connecting the chassis to a suspension member such as a Panhard rod.

BACKGROUND

Typically in such chassis the suspension mounting structures, generally referred to herein as suspension mounts, are configured as brackets which are attached (e.g. welded) to the beams to extend away from the beams in the width and/or height dimension of the chassis. The brackets allow the beams to be connected to suspension members such as one or more Panhard rods or spring packs which extend away from the chassis to transfer static or dynamic loads between the chassis and the axle assembly.

The suspension brackets are subjected to large forces and moments which may act about multiple axes, and so are typically of a heavy construction. This adds weight to the vehicle and can result in an abrupt change in stiffness and consequently a stress concentration at the bracket connection. The design of the suspension brackets may significantly influence the vehicle lifespan and capital and running costs, especially in trucks and other heavy duty applications.

SUMMARY

In accordance with the present disclosure there is provided a chassis for a vehicle. In a related aspect, the disclosure provides a vehicle having said chassis.

The chassis has a major, length dimension and minor, width and height dimensions, and includes a pair of beams spaced apart in the width dimension of the chassis, each beam extending in a length dimension of the beam for at least most of the length dimension of the chassis.

Each beam includes a pair of side plates spaced apart in the width dimension of the chassis and connected together by at least one plate, wall or web, referred to hereinafter as a web, the at least one web extending between the side plates in the length and width dimensions of the chassis.

Each side plate has a major, length dimension in the length dimension of the chassis, a minor, height dimension in the height dimension of the chassis, and a thickness in the width dimension of the chassis. The length dimension of each side plate extends for the full length dimension of the beam.

The side plates are configured to transmit along the beam in the length dimension of the chassis at least most of a load applied to the beam in the height dimension of the chassis.

At least one said beam further includes at least one suspension mount configured for connecting the beam to a suspension member of the vehicle to transfer loads to the suspension member. The suspension mount extends between the side plates of the respective beam and connects the side plates together (which is to say, it connects them to each other).

BRIEF DESCRIPTION OF THE DRAWINGS

Further features and advantages will be evident from the following illustrative embodiment which will now be described, purely by way of example and without limitation to the scope of the claims, and with reference to the accompanying drawings, in which:

Reference numerals and characters appearing in more than one of the figures indicate the same or corresponding parts in each of them.

DETAILED DESCRIPTION

Figure 1:
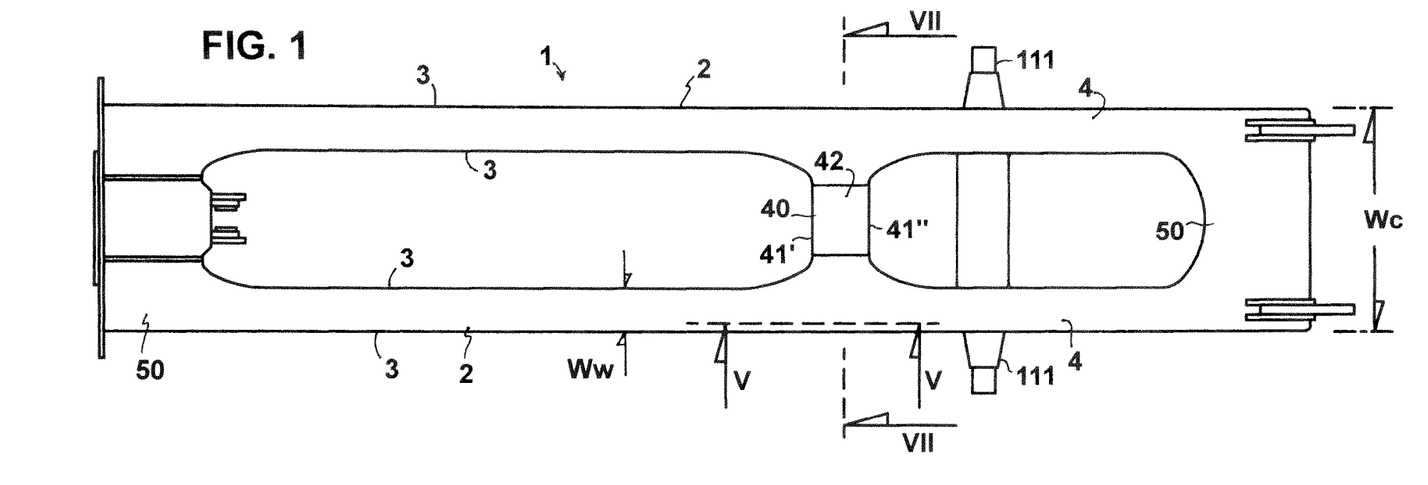
FIG. 1 is a top view of a chassis in accordance with a first embodiment.
Figure 2:
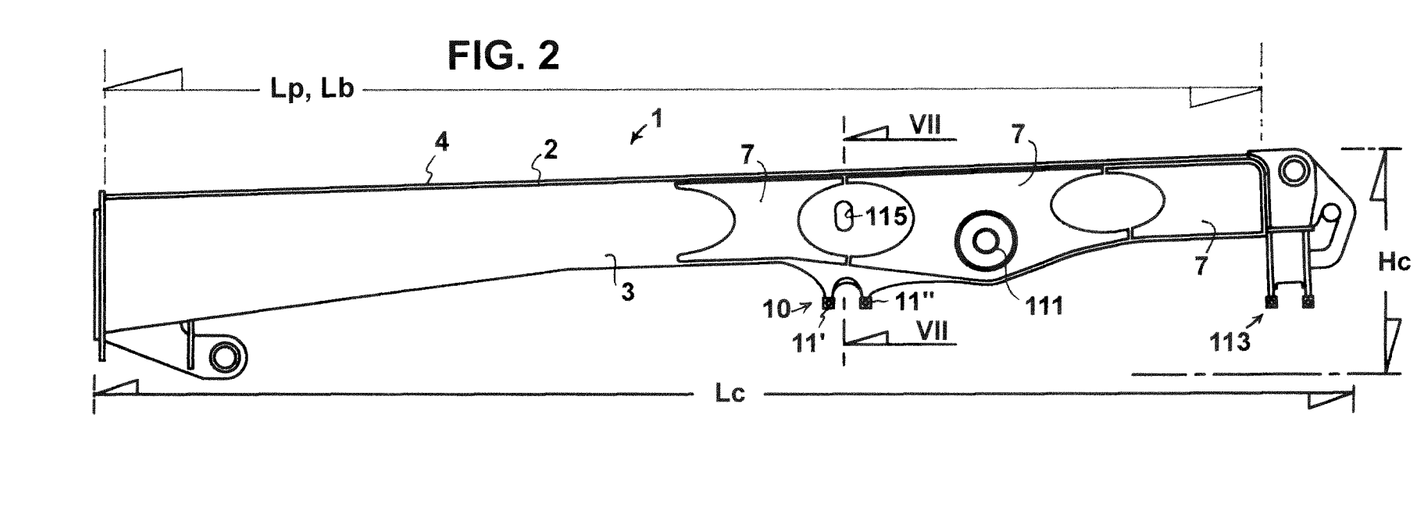
FIG. 2 is a side view of the chassis showing the left-hand beam.

Referring to FIGS. 1 and 2, a chassis 1 for a vehicle 100 may be fabricated for example from steel or other suitable metal, and has a major, length dimension Lc and minor, width Wc and height Hc dimensions (which is to say, the width and height dimensions are smaller than the length dimension).

The chassis includes a pair of first (left-hand) and second (right-hand) beams 2, which is to say, the principal longitudinal elements of the chassis, often referred to as rails. The first and second beams 2 may be arranged in parallel relation or approximately parallel relation and are spaced apart in the width dimension Wc of the chassis, each beam extending in a length dimension Lb of the beam for at least most of the length dimension Lc of the chassis. The beams 2 may be connected together by a plurality of crossmembers 40, 50. The spacing between the beams 2 may be constant as illustrated, or may vary along the length dimension Lc to suit the configuration of the vehicle body and suspension as well known in the art.

Referring also to FIGS. 3-7, each beam 2 includes a pair of first and second side plates 3 spaced apart in the width dimension Wc of the chassis. The side plates may be arranged in generally parallel relation.

Each side plate may consist of a single, shaped portion of a single piece of steel which was solidified from a molten condition to form said single piece of steel. That is to say, each side plate 3 may be formed from a single piece of steel rather than fabricated from two or more pieces which are joined together, e.g. by welding. It will be understood that, irrespective of whether each side plate 3 is formed from a single piece of steel, or fabricated from two or more pieces, each side plate may be locally reinforced by one or more stiffening plates 7 which may be welded to the side plate 3, e.g. as illustrated.

The first and second side plates 3 are connected together by at least one web, which, as illustrated, may include an upper web 4 and a lower web 5 spaced apart in the height dimension Hc of the chassis.

Each side plate 3 has a length dimension Lp and extends in its length dimension Lp for the full length dimension Lb of the beam 2. Thus, it will be understood that each side plate extends continuously between the opposite ends of the beam 2. The at least one web 4, 5 (or either or each of the upper and lower webs 4, 5) may also extend for most or all of the length dimension Lb of the beam 2. Thus, the length Lb of the beam 2 may be defined by the length Lp of the side plates 3, or the length of the side plates 3 and the upper and/or lower web 4, 5, as illustrated. The side plates and at least one web together are configured to transmit along the beam in the length dimension Lc of the chassis at least most of a bending moment applied by a load M to the beam 2 in the height dimension Hc of the chassis; which is to say, the side plates and at least one web together are the principal loadbearing elements of the chassis.

Figures 3, 4:
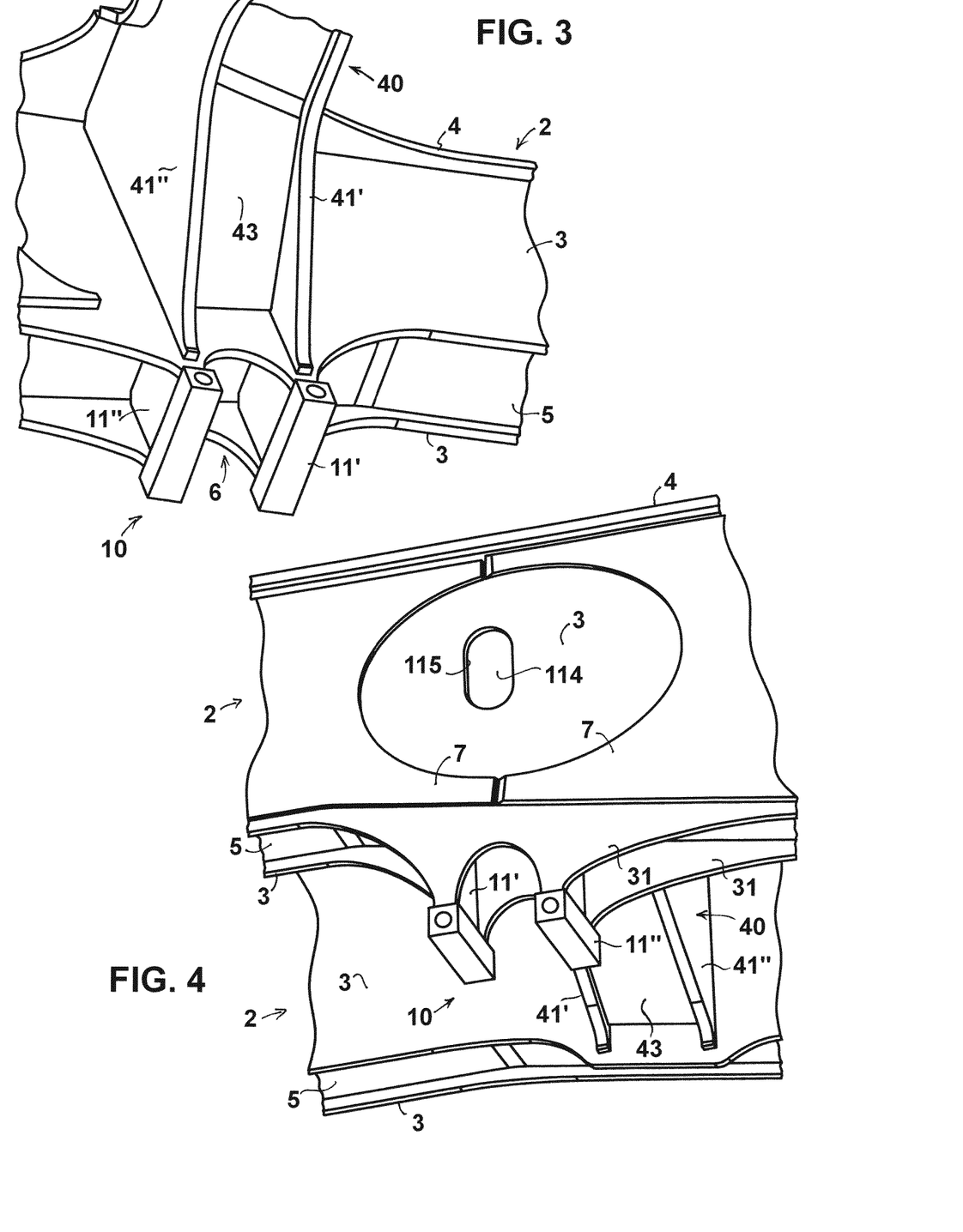
FIGS. 3 and 4 are enlarged views of one suspension mount provided on the left-hand beam of the chassis as shown in FIG. 2, seen respectively from the inwardly and outwardly facing sides of the beam.

In the illustrated example, the side plates 3 are locally stiffened by stiffening plates 7 welded to the side plate on the outwardly facing side of each beam.

Figure 6:
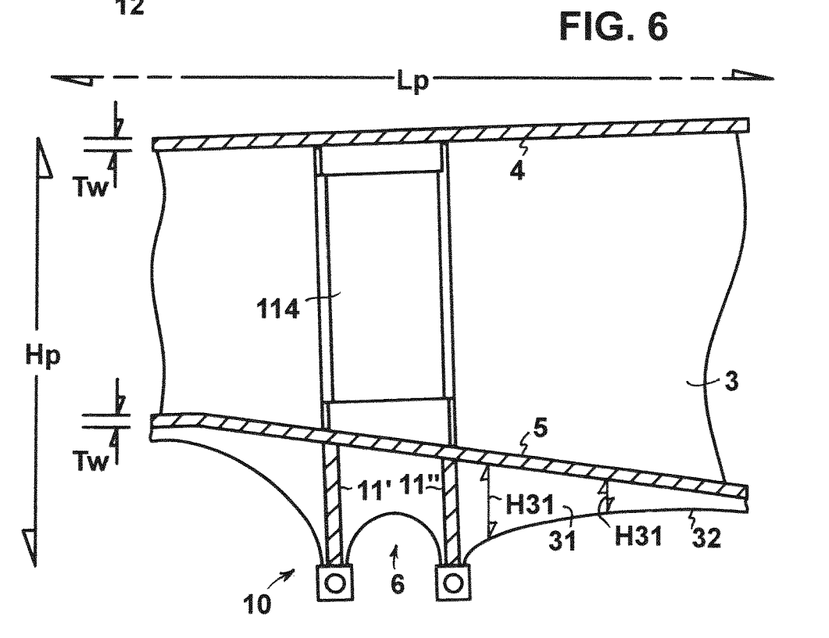

The upper and lower webs 4, 5 may be generally mutually parallel for all or, as shown, for only part of the length of the chassis. Alternatively or additionally, the spacing between them may vary along the length dimension Lc, for example, in regions of the chassis where the height dimension Hp of the plates 3 varies along their length dimension Lp, as best seen in FIG. 6.

Both the upper web 4 and the lower web 5 may be welded to the side plates 3. The upper web 4 may extend beyond the side plates 3 in the width dimension Wc of the chassis while the lower web 5 is contained between the side plates, as shown.

Each beam 2 may define a hollow or box section between the parallel side plates 3 and upper and lower webs 4, 5 as illustrated.

The at least one web (or as illustrated, each of the upper and lower webs 4, 5) has a minor, thickness dimension Tw in the height dimension Hc of the chassis, and extends between the side plates 3 in the length dimension Lc of the chassis, and in its width dimension Ww in the width dimension Wc of the chassis 1.

Each side plate 3 has a major, length dimension Lp in the length dimension Lc of the chassis, a minor, height dimension Hp in the height dimension Hc of the chassis, and a thickness Tp in the width dimension Wc of the chassis. The thickness of course is much smaller than the length and width.

At least one of the beams 2 further includes at least one suspension mount 10 configured for connecting the respective beam 2 to a suspension member 101 of the vehicle 100 to transfer loads to the suspension member.

By suspension member is meant any member that transfers static or dynamic loads from the chassis 1 directly or indirectly to a supporting or ground engaging (e.g. road wheel and axle) assembly 103 of the vehicle, which is movable relative to the chassis to absorb dynamic forces. In particular, the suspension member 101 may be configured to transfer dynamic loads acting in the width dimension Wc of the chassis. In use, the at least one suspension mount 10 may transfer loads from the chassis to the suspension member and from the suspension member to the chassis; for convenience, the action and reaction of the load transfer via the suspension mount is referred to herein simply as transferring loads to the suspension member.

Referring also to FIGS. 8-11, typically the suspension system includes resilient elements 110 for absorbing dynamic forces and supporting the vertical load M applied by the mass of the vehicle body 102, as well as one or more Panhard rods 101 or other elements for transferring lateral loads acting generally in the width dimension Wc of the chassis between the chassis and the axle assembly 103. In the illustrated example each beam 2 includes a pivot 111 for transferring the load M via a walking beam suspension assembly 112 including resilient elements 110 to a pair of centre and rear axle assemblies 103 which transfer the vertical load M via the wheels to the ground.

In the illustrated example, the suspension member 101 comprises a rigid tie-bar or Panhard rod which is pivotably connected to the suspension mount 10 and to the centre axle assembly 103 to react lateral forces applied between the chassis and the centre axle assembly of the vehicle, as shown in FIGS. 8-11. One or more additional suspension mounts of the same construction as suspension mount 10 may be provided on one or both beams 2. In the illustrated example a rear suspension mount 113 of different construction is also provided for connecting another Panhard rod to the rear axle assembly 103.

As best seen in FIGS. 3-7, the suspension mount 10 is integrated into the primary structure of the beam 2 so that it extends between the side plates 3 and connects the side plates 3 together, for example, being welded to the side plates 3 and/or the lower web 5.

The suspension mount 10 may include at least one mount body or, as illustrated, two (first and second) mount bodies 11', 11" spaced apart in the length dimension Lc of the chassis, wherein the or each mount body 11', 11" extends between the side plates 3 in the height and width dimensions Hc, Wc of the chassis. Each mount body 11', 11" may be welded to the side plates 3 (e.g. to the facing surfaces of the side plates 3), as shown. Each mount body 11', 11" may also be welded to the lower web 5, as shown. Each mount body 11', 11" may comprise a connection means such as a through-hole 12 to receive bolts 13 for connecting the suspension member 101 to the mount.

Each mount body 11', 11" may comprise an upper portion formed as a plate which is substantially contained between the side plates 3 as shown and connects the side plates together. The upper portion of the mount body may thus connect the mount body to the side plates and to the lower web 5, e.g. by welds. The connection means, e.g. through-hole 12, may be formed as shown in a lower portion of the respective mount body which may be welded to the upper portion and may extend in the width dimension Wc of the chassis somewhat beyond or through the thickness of the side plates.

The suspension member 101 may be received between the mount bodies 11', 11". Each side plate 3 may define a recess 6 between the mount bodies 11', 11" and opening at a lower margin 32 of the side plate to accommodate an end region of the suspension member 101, which may comprise a tie-bar 104 and a bushing or pivot assembly 105 which is arranged between the mount bodies 11', 11" to provide a movement or shock-absorbing or pivotal connection between the mount 10 and the tie-bar 104, as shown. Assembly 105 may comprise for example an elastomeric straddle bushing.

Optionally as shown, the pivot assembly 105 may include a fixed connector or pivot axle 106 which is fixedly attached to the mount bodies 11', 11" to extend between the mount bodies 11', 11", wherein the tie-bar 104 is accommodated in the recess 6 and is movable or pivotable about the pivot axle 106.

Figure 5:
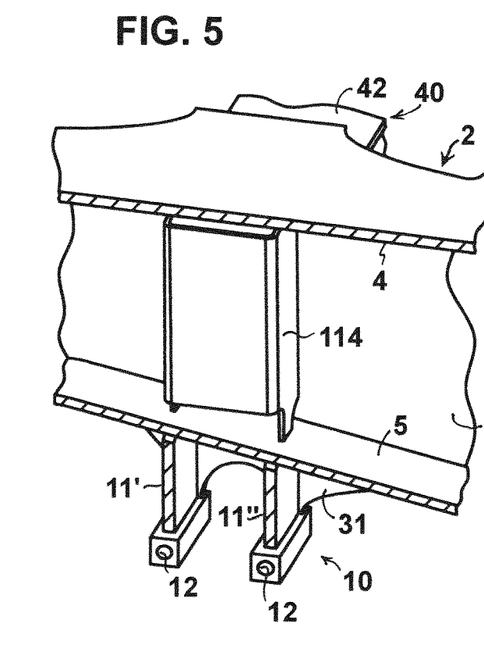
FIGS. 5 and 6 are partial sections through the suspension mount, taken just inwardly of the outer side plate at V-V of FIG. 1.

As best seen in FIGS. 5 and 6, a lower portion 31 of each side plate 3 of the respective beam 2 on which the suspension mount 10 is arranged (or of each beam 2) may extend downwardly in the height dimension Hc of the chassis 1 below the at least one web (so, where upper and lower webs 4, 5 are provided, below the lower web 5). The suspension mount 10 may be arranged below the at least one web or lower web 5 and between the lower portions 31 of the side plates 3 of the respective beam 2.

As shown in FIG. 6, a height dimension H31 of the lower portion 31 of each side plate 3 of the respective beam 2 on which the mount 10 is arranged, between the at least one web (so, the lower web 5 in the illustrated embodiment) and a lower margin 32 of the side plate in the height dimension Hc of the chassis, may reduce progressively away from the suspension mount 10 in the length dimension Lc of the chassis, in either or both of the forward and rearward directions of the chassis. Optionally, as can also be seen in FIG. 6, the lower margin 32 of each side plate 3 proximate the suspension mount 10 may be curved in the height dimension Hc of the chassis. For example, the lower margin 32 of the plate proximate the mount 10 may be curved with constant radius or may have an elliptical curvature, either forward or rearward of the mount 10 or (as shown) both forward and rearward of the mount with respect to the length direction of the chassis.

Optionally as shown, a crossmember 40 may be arranged to extend between the beams 2 of the chassis and connected at a first one of its ends to a respective one of the side plates 3 of the respective beam 2 on which the suspension mount 10 is arranged, proximate the suspension mount 10. The crossmember may be connected at its other (second) end to the corresponding one of the side plates 3 of the opposite beam 2, so that it extends as shown in FIG. 1 between the opposed side plates 3 of the two beams 2. As shown in the top view of the chassis in FIG. 1, a pair of openings can be formed between the pair of beams 2 on opposite sides of the crossmember 40 in the length direction of the chassis. Each of the openings having a length in the length dimension of the chassis greater than a width in the width direction of the chassis, such as shown in FIG. 1.

If more than one suspension mount 10 is provided, each may be supported by a crossmember 40 as shown. Alternatively, the or each suspension mount 10 may be arranged without a crossmember 40.

Figure 7:
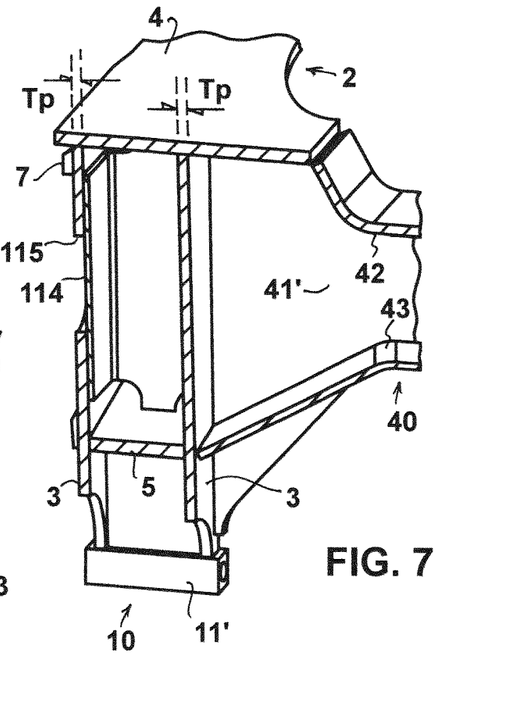
FIG. 7 is another section taken through the suspension mount and the crossmember at VII-VII of FIGS. 1 and 2.
Figures 8, 9, 10, 11:
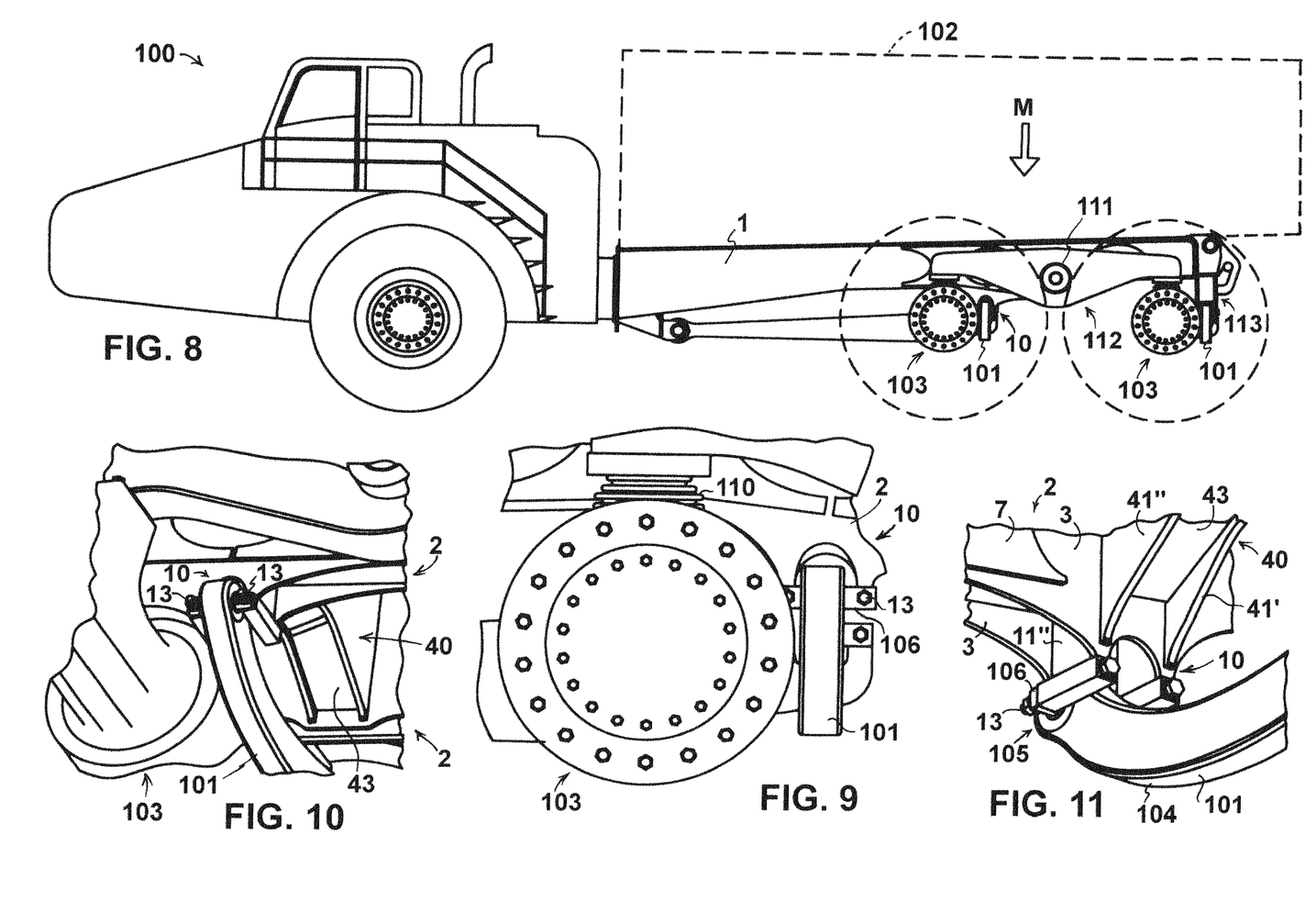
FIG. 8 shows a vehicle equipped with the chassis.
FIG. 9 is an enlarged view of the suspension mount as shown in FIG. 8.
FIGS. 10 and 11 are further views of the suspension mount as shown in FIGS. 8 and 9, seen respectively from the outwardly and inwardly facing sides of the beam.

As best seen in FIGS. 3, 4 and 7, the crossmember 40 may include first and second crossmember plates 41', 41" extending in the width and height dimensions Wc, Hc of the chassis and spaced apart in the length dimension Lc of the chassis.

The first and second crossmember plates 41', 41" may be connected together by one or, as illustrated, two, upper and lower crossmember webs 42, 43. As illustrated, the plates 41', 41" may be arranged in mutually parallel relation, and the webs 42, 43 may also be arranged in mutually parallel relation for all or, as shown, part of the length of the crossmember in the width dimension Wc of the chassis. Alternatively or additionally, the spacing between the webs 42, 43 may vary along the width dimension Wc of the chassis, for example, where the upper or lower margin of the crossmember plates 41', 41" is profiled along the width dimension Wc of the chassis as shown.

As illustrated, the first crossmember plate 41' may be connected to the respective one of the side plates 3 of the respective beam 2 on which the suspension mount is arranged, and proximate the first mount body 11' of the suspension mount 10. The second crossmember plate 41" may be connected to that same respective one of the side plates 3 of that same respective beam 2 on which the suspension mount is arranged, proximate the second mount body 11" of the suspension mount 10. In this way the two crossmember plates 41', 41" may stiffen the beam and side plates, and in particular may stiffen the lower portion 31 of the same respective side plate 3 of the beam 2 on which the suspension mount is arranged, proximate the two mount bodies 11', 11".

As best seen in FIGS. 5-7, a stiffening channel or insert 114 may be arranged within the box section formed between the side plates 3 and upper and lower webs 4, 5 of the beam. Conveniently, an aperture 115 may be formed in one of the side plates 3 to facilitate assembly. The stiffening insert 114 may then be welded to one (e.g. the inward one, as shown) of the side plates 3 and to the upper and/or lower webs 4, 5 in a first operation, before the remaining side plate 3 is added to close the box section. In a second operation, a face of the stiffening insert 114 can then be welded at the margin of the aperture to the remaining side plate 3 (in the illustrated example, the outer one of the side plates 3) to complete the assembly, as best seen in FIG. 7.

In summary, a vehicle chassis 1 comprises a pair of beams 2, each beam having generally parallel side plates 3 extending in height and length dimensions Hc, Lc of the chassis and joined by one or more webs 4, 5 extending between the side plates 3 in the width dimension Wc, which together form its principal loadbearing elements. At least one of the beams includes at least one suspension mount 10 which extends between the side plates 3 and connects the side plates 3 together.

INDUSTRIAL APPLICABILITY

The arrangement of the suspension mount 10 between the side plates 3 of the chassis beam 2 may reduce stress concentrations by providing a more gradual change in stiffness along the length of the beam 2. This can be enhanced by a progressive reduction in height H31 of the lower portion 31 of the side plate 3, particularly where the lower margin 32 of the side plate 3 is curved. The more gradual change in stiffness may reduce stress concentrations which in turn allows the overall weight of the beams to be reduced, with concomitant improvement in vehicle fuel efficiency, without reducing the durability of the chassis 1.

By forming each side plate 3 as a unitary piece of steel rather than a fabricated assembly, the fatigue properties of the chassis in the region of the suspension mount 10 are governed by the parent material of the side plate 3 rather than by the limitations of the welding or other fabrication technique used to attach the prior art mount, and so may be further improved.

The provision of a crossmember or crossmembers 40 can further enhance the strength-to-weight ratio of the beam 2 in the region of the mount 10, particularly where the two plates 41', 41" of the crossmember 40 are connected proximate the two mount bodies 11', 11" to provide stiffness out of the plane of the side plates 3 of the beam 2.

The novel chassis 1 may be used on vehicles including wheeled road vehicles 100 (which is to say, vehicles running on wheels that can be steered over a paved road or other ground surface). In particular, the novel chassis 1 may provide improved lifespan or reduced costs in heavy vehicles, for example, trucks (including the tractor or trailer units of articulated trucks) or other road vehicles that have a gross weight, for example, of 10 tonnes or more.

Many further adaptations are possible within the scope of the claims.

In the claims, reference numerals and characters are provided in parentheses, purely for ease of reference, and are not to be construed as limiting features.

LIST OF ELEMENTS

Title:
   Vehicle chassis having twin walled beams with suspension mounting structure
   FILE: 18-1391-70822
   1 chassis
   2 beams
   3 side plate
   4 upper web
   5 lower web
   6 recess
   7 stiffening plates
   10 suspension mount
   11' first mount body
   11" second mount body
   12 through-hole
   13 bolt
   31 lower portion
   32 lower margin
   40 crossmember
   41' first crossmember plate
   41" second crossmember plate
   42 upper crossmember web
   43 lower crossmember web
   50 crossmember
   100 vehicle
   101 suspension member
   102 vehicle body
   103 axle assembly
   104 tie-bar
   105 pivot assembly
   106 fixed connector or pivot axle
   110 resilient elements
   111 pivot
   112 walking beam suspension assembly
   113 rear suspension mount
   114 stiffening insert
   115 aperture
   H31 height dimension of lower portion
   Hc height dimension of chassis
   Hp height dimension of side plates
   Lc length dimension of chassis
   Lb length dimension of beam
   Lp length dimension of side plates
   M load
   Tp thickness dimension of side plates
   Tw thickness dimension of webs
   Wc width dimension of chassis
   Ww width dimension of webs

What is claimed is:

1. A chassis for a vehicle, the chassis having a major, length dimension and minor, width and height dimensions, and comprising:
   a pair of beams spaced apart in the width dimension of the chassis, each beam extending in the length dimension of the chassis;
   each said beam including a pair of side plates spaced apart from each other in the width dimension of the chassis and connected together by at least one web, the at least one web extending between the side plates of each said pair in the length and width dimensions of the chassis;
   each said side plate having a major, length dimension in the length dimension of the chassis, a minor, height dimension in the height dimension of the chassis, and a thickness in the width dimension of the chassis, each said side plate extending for the full length dimension of a corresponding one of the beams;
   the side plates and the at least one web together being configured to transmit along the corresponding beam in the length dimension of the chassis a portion of a bending moment applied by a load to the corresponding beam in the height dimension of the chassis;
   at least one of the beams further including a suspension mount to connect the beam to a suspension member of the vehicle to transfer loads to the suspension member; and
   a crossmember, the crossmember extending between the beams of the chassis and connected to respective ones of the side plates of the beams at the suspension mount,
   wherein the suspension mount extends between the side plates of the respective beam and connects said side plates together,
   wherein each of the side plates is a unitary piece of metal,
   wherein, in a side elevational view of the chassis, the height dimension of each of the side plates decreases from one end of the side plate toward the crossmember, with top edges of the side plates remaining at a same height and bottom edges of the side plates opposite the top edges decreasing in the height dimension,
   wherein in an overhead plan view of the chassis a pair of openings are formed between the pair of beams on opposite sides of the crossmember in the length direction of the chassis, each of the openings having a length in the length dimension of the chassis greater than a width in the width direction of the chassis, and
   wherein the suspension mount directly contacts a corresponding pair of the side plates of one of the beams.

2. The chassis according to claim 1, wherein a lower portion of each said side plate of said respective beam extends downwardly in the height dimension of the chassis below the at least one web, and the suspension mount is arranged below the at least one web and between the lower portions of the side plates of the respective beam.

3. The chassis according to claim 2, wherein the at least one web of each said beam includes an upper web and a lower web spaced apart in the height dimension of the chassis.

4. The chassis according to claim 1, wherein a height dimension of a lower portion of each said side plate of said respective beam between the at least one web and a lower margin of the side plate in the height dimension of the chassis reduces progressively away from the suspension mount in the length dimension of the chassis.

5. The chassis according to claim 4, wherein the lower margin of each side plate of said respective beam at the suspension mount is curved in the height dimension of the chassis.

6. The chassis according to claim 1, wherein the suspension mount includes first and second mount bodies spaced apart in the length dimension of the chassis, each said mount body extending between the side plates of said respective beam in the height and width dimensions of the chassis.

7. The chassis according to claim 1, wherein
the crossmember includes first and second crossmember plates extending in the width and height dimensions of the chassis and spaced apart in the length dimension of the chassis;
the suspension mount includes first and second mount bodies spaced apart in the length dimension of the chassis, each said mount body extending between the side plates of said respective beam in the height and width dimensions of the chassis;
the first crossmember plate is connected to said respective one of the side plates of said respective beam proximate the first mount body; and
the second crossmember plate is connected to said respective one of the side plates of said respective beam proximate the second mount body.

8. The chassis according to claim 1, wherein each said side plate consists of a single, shaped portion of a single piece of steel as the metal, which was solidified from a molten condition to form said single piece of steel.

9. The chassis according to claim 1, wherein each of the side plates forms, in the side elevational view of thereof, an arch, the arch being inward of opposite ends of the side plate.

10. The chassis according to claim 1,
wherein, for each said pair of side plates, the at least one web extends between inner side surfaces of the side plates at upper end portions of the side plates, and
wherein, for each said pair of side plates, the inner side surfaces of the side plates have bottom end portions, which are opposite the upper end portions, that are free of any of webs and that form an opening exposing the at least one web at the upper end portion of the side plate to outside the chassis.

11. A vehicle comprising a chassis, the chassis having a major, length dimension and minor, width and height dimensions, and including:
a pair of beams spaced apart in the width dimension of the chassis, each beam extending in the length dimension of the chassis;
each said beam including a pair of side plates spaced apart from each other in the width dimension of the chassis and connected together by at least one web, the at least one web extending between the side plates of each said pair in the length and width dimensions of the chassis;
each said side plate having a major, length dimension in the length dimension of the chassis, a minor, height dimension in the height dimension of the chassis, and a thickness in the width dimension of the chassis, each said side plate extending for the full length dimension of a corresponding one of the beams;
the side plates and the at least one web together being configured to transmit along the corresponding beam in the length dimension of the chassis a portion of a bending moment applied by a load to the corresponding beam in the height dimension of the chassis;
at least one of the beams further including a suspension mount to connect the beam to a suspension member of the vehicle to transfer loads to the suspension member; and
a crossmember, the crossmember extending between the beams of the chassis and connected to respective ones of the side plates of the beams at the suspension mount,
wherein the suspension mount extends between the side plates of the respective beam and connects said side plates together,
wherein the height dimension of each of the side plates decreases from one end of the side plate,
wherein in an overhead plan view of the chassis a pair of openings are formed between the pair of beams on opposite sides of the—crossmember in the length direction of the chassis, each of the openings having a length in the length dimension of the chassis greater than a width in the width direction of the chassis,
wherein the suspension mount includes first and second mount bodies spaced apart in the length dimension of the chassis, each said mount body extending between the side plates of said respective beam in the height and width dimensions of the chassis,
wherein, for each said pair of side plates, the at least one web extends between inner side surfaces of the side plates at upper end portions of the side plates, and
wherein, for each said pair of side plates, the inner side surfaces of the side plates have bottom end portions, which are opposite the upper end portions, that are free of any of webs and that form an opening exposing the at least one web at the upper end portion of the side plate to outside the chassis.

12. The vehicle according to claim 11, wherein a lower portion of each said side plate of said respective beam extends downwardly in the height dimension of the chassis below the at least one web, and the suspension mount is arranged below the at least one web and between the lower portions of the side plates of the respective beam.

13. The vehicle according to claim 11, wherein a height dimension of a lower portion of each said side plate of said respective beam between the at least one web and a lower margin of the side plate in the height dimension of the chassis reduces progressively away from the suspension mount in the length dimension of the chassis.

14. The vehicle according to claim 13, wherein the lower margin of each side plate of said respective beam at the suspension mount is curved in the height dimension of the chassis.

15. The vehicle according to claim 11, wherein
the crossmember includes first and second crossmember plates extending in the width and height dimensions of the chassis and spaced apart in the length dimension of the chassis;
the suspension mount includes first and second mount bodies spaced apart in the length dimension of the chassis, each said mount body extending between the side plates of said respective beam in the height and width dimensions of the chassis;
the first crossmember plate is connected to said respective one of the side plates of said respective beam proximate the first mount body; and
the second crossmember plate is connected to said respective one of the side plates of said respective beam proximate the second mount body.

16. The vehicle according to claim 11, wherein each of the side plates forms, in a side elevational view of thereof, an arch, the arch being inward of opposite ends of the side plate.

17. The vehicle according to claim 11, wherein, in a side elevational view of the chassis, the height dimension of each of the side plates decreases from one end of the side plate toward the crossmember, with top edges of the side plates remaining at a same height and bottom edges of the side plates opposite the top edges decreasing in the height dimension.

\* \* \* \* \*